May 14, 1968     P. B. CLOVER     3,383,073
TILTING IMPELLERS FOR VERTICAL-TAKEOFF-LANDING AIRCRAFT
Filed April 4, 1966
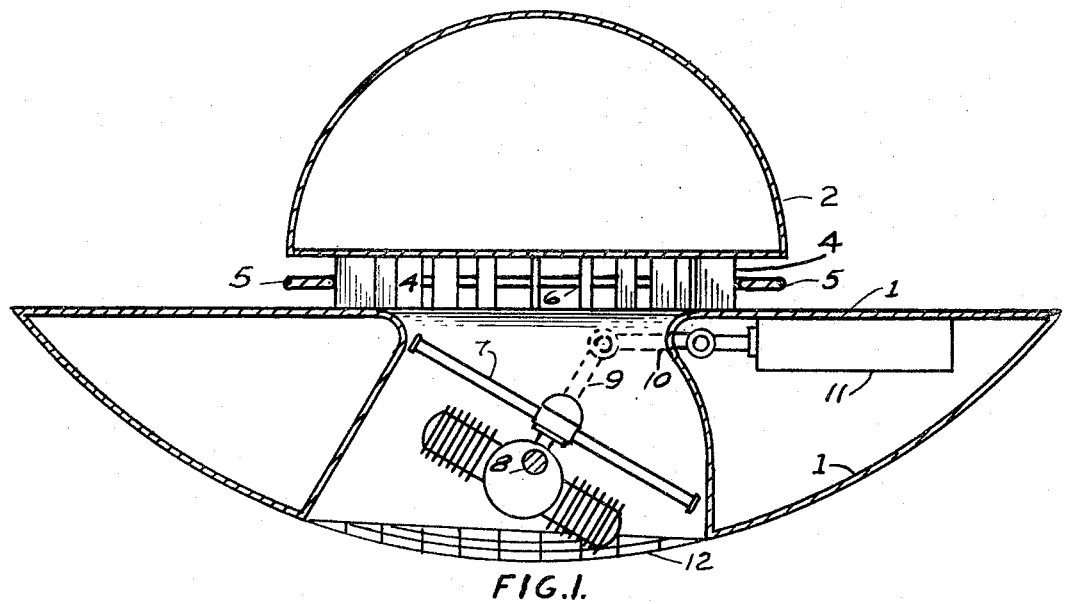
FIG.1.
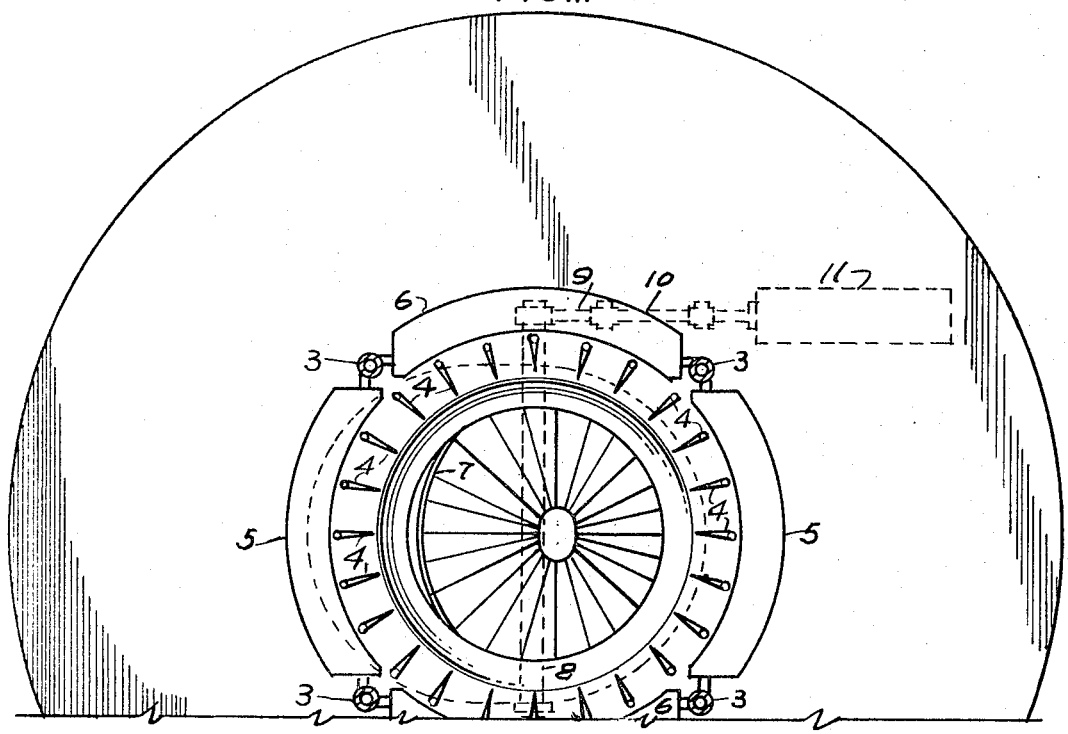
FIG.2.    Paul B. Clover INVENTOR.

United States Patent Office 3,383,073
Patented May 14, 1968

3,383,073
TILTING IMPELLERS FOR VERTICAL-TAKEOFF-LANDING AIRCRAFT
Paul B. Clover, 108 Professional Center Parkway,
San Rafael, Calif. 94903
Filed Apr. 4, 1966, Ser. No. 541,931
3 Claims. (Cl. 244—23)

ABSTRACT OF THE DISCLOSURE

A tilting impeller, with particular application to aircraft, mounted within a duct to produce forces of lift and translation on the duct structure when tilted about an axis transverse to the airstream.

This invention relates in general to aircraft and more particularly to lift and propulsion means for vertical-takeoff-landing aircraft.

This present invention has special reference to and consists of improvements in the arrangements described in my patent application No. 363,347 filed Apr. 27, 1964, now Patent No. 3,243,146.

The impelling means shown in my previous application is fixed in a horizontal position relative to the enclosing structure thereby causing a column of air to move vertically inducing momentum drag when the aircraft is in forward motion.

An object of this invention is to reduce momentum drag from the induced airflow.

Another object of this invention is to produce additional forward thrust from the discharging air.

Another object of this invention is to reduce the degree of aircraft tilting in the direction of flight thereby improving its streamline characteristics by reducing the frontal area exposed to the airstream and the resultant drag.

Other objects and a fuller understanding of this invention may be had by referring to the following description and claims taken in conjunction with the accompanying drawing in which:

FIGURE 1 shows a sectional view of the aircraft taken along the horizontal diameter.

FIGURE 2 is a partial plan view with the cap removed to expose the structure.

With reference to the drawing the invention is illustrated as being incorporated within an aircraft indicated generally by the reference characters 1 through 6 and the improvement invention by the reference characters 7 through 12.

The aircraft comprises an airfoil 1, cap 2, supports 3, torque vanes 4, fore and aft ailerons 5, lateral ailerons 6, an impelling means for moving air 7 mounted on a transverse axis 8, and an actuating means for tilting the impelling means comprised of connecting means 9 and 10 and a power source 11, and finally a grill or louver 12 at the exit to the impeller enclosure.

In operation air is drawn over the upper surface of the airfoil 1 thence under the periphery of the cap 2, thence around the control surfaces 4, 5 and 6, thence through the impelling means 7 that can be tilted forward about the transverse axis 8 when actuated by means 9, 10, and 11, thence exhausted through the grill or louver 12. Lift is produced by the lower-than-atmospheric pressure over the upper surface of the airfoil coupled with thrust from the discharging air. Tilting the impelling means forward within the enclosing duct reduces the vertical travel of the air mass and the corresponding momentum drag while providing a forward thrust component from the angular discharge of exhaust air from the impelling means. Forward thrust can be increased by means of a grill or louver of reasonably conventional design. Control and stability are maintained at all times while the impelling means is in operation by the passage of air about the control surfaces. Pitch is controlled by the fore and aft ailerons 5, roll by the lateral ailerons 6, torque and turning control by the vanes 4.

Construction methods and materials are those commonly used for aircraft. The airfoil 1 and cap 2 are spaced and secured in their proper relative positions by means of supports 3 and together define a space within which is mounted a means for moving air. This configuration causes incoming air to produce lift, then exhaust in a manner to produce thrust. The impelling means 7 may be a propeller, fan or other type of air mover and may be either directly connected to a power plant as shown or indirectly connected to a remote power source by mechanical means such as shafts and gearing, electrical means, or by fluid transmission such as gas from a generator to a turbine scroll case. The impelling means may be mounted on an axis 8 such as a solid shaft fitted with bearings, or a shaft fitted with bearings and designed to accommodate a geared drive, or again hollow tubes fitted with bearings and adapted to carry fluid to the scroll case of a turbine-impeller combination. The impelling means may be tilted to any degree about the transverse axis 8 using a lever 9 connecting rod 10 and power cylinder 11 as shown. However tilting of the impelling means and the degree of tilt are not limited to the means and degree shown. Tilting may be accomplished by any conventional mechanical, electrical, or hydraulic equipment commonly used for service of this kind. Control of the aircraft is maintained by means of the vanes 4, fore and aft ailerons 5, and lateral ailerons 6 operatively mounted within the inlet space to react with the incoming air when the impeller is in operation. These control surfaces are connected to conventional aircraft control systems for stability and maneuvering. Loads may be carried within the cap or within the airfoil.

Although this invention has been described with a certain degree of particularity, it is understood that the present disclosure has been made only by way of example and that numerous changes in details of construction and the combination and arrangement of parts may be resorted to without departing from the spirit and scope of the invention as hereinafter claimed.

I claim as my invention:

1. In an aircraft comprising an annular airfoil with a central opening said airfoil supporting a cap spaced above and mounted axially with said opening the cap and airfoil together defining a duct within which ailerons controlling pitch and roll and torque vanes controlling turning of the aircraft are operatively mounted, the combination thereof with improvement comprising an impelling means operatively mounted within said duct downstream from said control means said impelling means being tiltably mounted on a single axis transverse to the fore and aft centerline of the aircraft providing both lift and forward thrust.

2. In an aircraft comprising an annular airfoil with a central opening said airfoil supporting a cap spaced above and mounted axially with said opening the cap and airfoil together defining a duct within which ailerons controlling pitch and roll and torque vanes controlling turning of the aircraft are operatively mounted, the combination thereof with improvement comprising an impeller directly connected to a power means operatively mounted within said duct downstream from said control means said impelling means being tiltably mounted on a single axis transverse to the fore and aft centerline of said aircraft providing both lift and forward thrust.

3. A lift and propulsion means for aircraft comprising in combination an annular duct within which ailerons are operatively mounted to react with inlet air to control pitch and roll motions transverse to the direction of airflow in said duct and torque vanes to control duct rotation about its axis parallel to the direction of airflow in said duct, an impelling means operatively mounted within said duct downstream from said control means said impelling means tiltably mounted on a single axis transverse to the fore and aft centerline of said aircraft providing both lift and forward thrust.

References Cited

UNITED STATES PATENTS

| | | | |
|---|---|---|---|
| 2,843,339 | 7/1958 | Streib | 244—12 |
| 2,936,972 | 5/1960 | Zinavage | 244—23 |
| 2,876,965 | 3/1959 | Streib | 244—12 |
| 2,937,492 | 5/1960 | Lehberger | 244—23 |
| 3,034,747 | 5/1962 | Lent | 244—23 |
| 3,237,888 | 3/1966 | Willis | 244—23 |
| 3,335,977 | 8/1967 | Meditz | 244—66 |

MILTON BUCHLER, *Primary Examiner.*

FERGUS S. MIDDLETON, *Examiner.*

T. W. BUCKMAN, *Assistant Examiner.*